United States Patent [19]
Legallais

[11] Patent Number: 5,349,989
[45] Date of Patent: Sep. 27, 1994

[54] FLUID TRANSPORTATION MULTICONDUIT UMBILICAL

[75] Inventor: Lucien Legallais, Orgeval, France

[73] Assignee: Dunlop Coflexip Umbilicals Limited, London, United Kingdom

[21] Appl. No.: 962,587

[22] Filed: Dec. 29, 1992

[30] Foreign Application Priority Data

Jun. 29, 1990 [GB] United Kingdom ........... 9014514
Jan. 22, 1991 [GB] United Kingdom ........... 9101424

[51] Int. Cl.⁵ .................................................. F16L 9/18
[52] U.S. Cl. .................................. 138/111; 138/112; 138/113; 138/114
[58] Field of Search ............. 138/111, 112, 113, 114, 138/137

[56] References Cited

U.S. PATENT DOCUMENTS

| | | |
|---|---|---|
| 1,718,978 | 7/1929 | Protzeller ............... 138/112 |
| 2,136,230 | 11/1938 | Berman et al. ......... 138/137 |
| 2,420,221 | 5/1947 | Bell ........................ 138/111 |
| 2,578,280 | 12/1951 | Barnard .................. 138/111 |
| 2,604,509 | 7/1952 | Blanchard ............... 138/130 |
| 2,624,366 | 1/1953 | Pugh ....................... 138/137 |
| 2,778,609 | 1/1957 | Peeps ..................... 138/137 |
| 2,971,538 | 2/1961 | Brumbach ............... 138/111 |
| 3,400,737 | 9/1968 | Matthews et al. ...... 138/111 |
| 3,791,898 | 2/1974 | Remi ...................... 138/130 |
| 3,866,670 | 2/1975 | Cramer et al. .......... 138/111 |
| 4,194,536 | 3/1980 | Stine et al. .............. 138/111 |
| 4,256,146 | 3/1981 | Genini et al. ............ 138/111 |
| 4,332,509 | 6/1982 | Reynard et al. ......... 138/111 |
| 4,402,346 | 9/1983 | Cheetham et al. ...... 138/137 |
| 4,436,778 | 3/1984 | Dugal ..................... 138/137 |
| 4,684,427 | 8/1987 | Abernathy ............... 138/111 |
| 4,758,455 | 7/1988 | Campbell et al. ....... 138/126 |
| 4,850,395 | 7/1989 | Briggs . | |

FOREIGN PATENT DOCUMENTS

| | | |
|---|---|---|
| 2944858 | 5/1981 | Fed. Rep. of Germany . |
| 2069439 | 9/1971 | France . |
| WO8502001 | 5/1985 | PCT Int'l Appl. . |
| 659593 | 10/1951 | United Kingdom . |
| 1175042 | 12/1969 | United Kingdom . |
| 1229612 | 4/1971 | United Kingdom . |
| 1283216 | 7/1972 | United Kingdom . |
| 1347691 | 2/1974 | United Kingdom . |

Primary Examiner—James E. Bryant, III
Attorney, Agent, or Firm—Stevens, Davis, Miller & Mosher

[57] ABSTRACT

For the transportation of a fluid such as a methanol or glycol there is provided a multi-conduit umbilical (20) having a conduit which comprises a hose (10,21,22) having a lining layer (11) of polyethylene, for example cross-linked polyethylene, arranged to restrain permeation of fluid from the bore of the hose (10,21,22).

11 Claims, 1 Drawing Sheet

U.S. Patent  Sep. 27, 1994  5,349,989
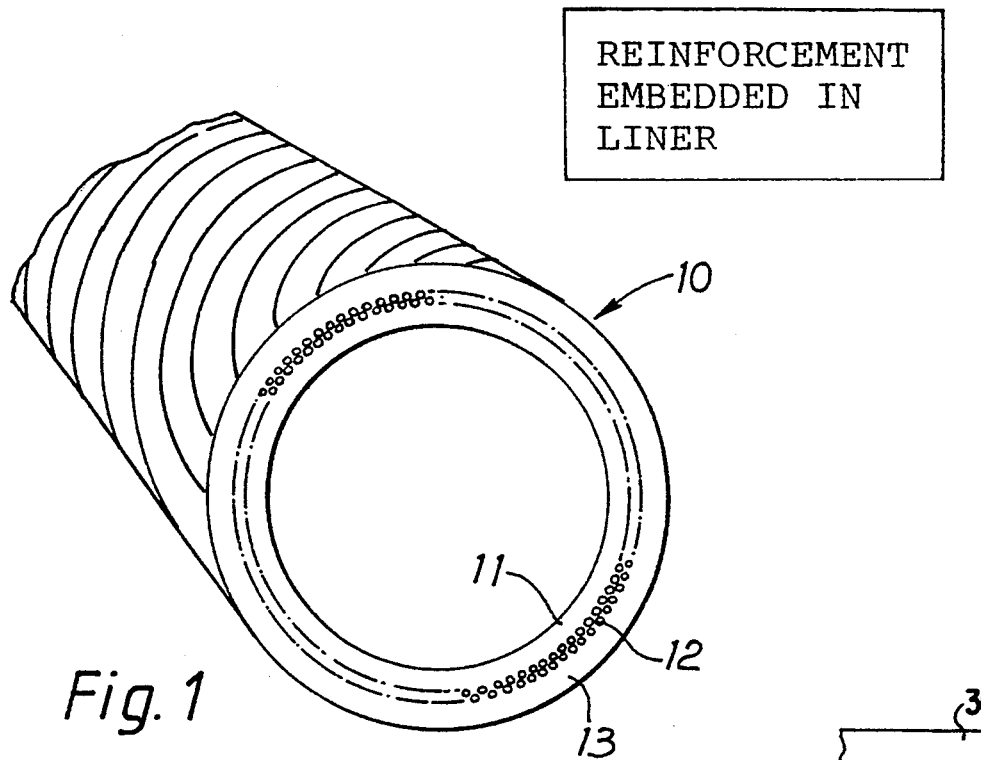
REINFORCEMENT EMBEDDED IN LINER
Fig. 1
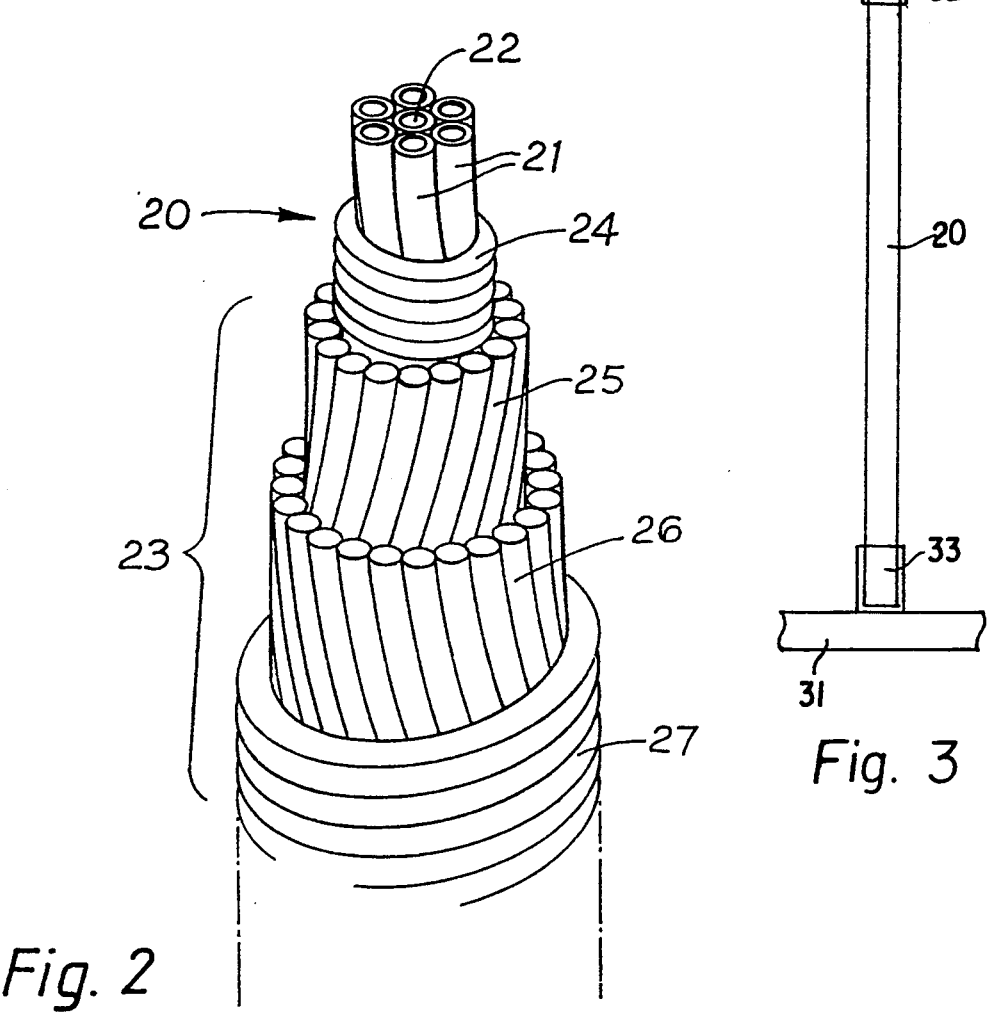
Fig. 2
Fig. 3

1

FLUID TRANSPORTATION MULTICONDUIT UMBILICAL

BACKGROUND OF THE INVENTION

This invention relates to a method of transporting methanol or glycol and to a reinforced hose and a multi-conductor umbilical incorporating as a conduit type of conductor said reinforced hose for use in the method of the invention. The invention relates in particular, although not exclusively, to the transportation of methanol or glycol over a distance of at least 3 kilometers and to a hose or umbilical of at least that length.

In the exploration and operation of offshore oil wells from offshore platforms it can be necessary to supply methanol or glycol from the platform to the well-head for example to remove accumulated hydrates. The supply of methanol or glycol is achieved by the use of long length flexible hoses, or multi-conduit type hoses, i.e. umbilicals, in which at least one of the conduits is used for methanol or glycol transportation. The hose or umbilical is provided with appropriate end fittings for achieving fluid tight connections.

A problem which has been found to arise is that methanol or glycol in liquid form and also, particularly dangerously in the case of methanol, in vapour form is found to accumulate at the platform. Despite close study of the design of the end fitting by which the end of the hose or umbilical is secured to a platform, prior to the making of this invention it has not been possible effectively to prevent that accumulation.

In practice it has been necessary to terminate the long length hose or umbilical at a connection point well underneath the platform deck, which is inconvenient from a maintenance and operational standpoint, or to provide special drainage and ventilation arrangements at a deck level termination.

SUMMARY OF THE INVENTION

The present invention seeks to provide an improved method for the transportation of methanol or glycol, particularly but not exclusively over a length of at least 3 kilometers, and an improved hose or conduit for use in the method.

In accordance with one of its aspects the present invention provides a method for transporting methanol or glycol between two stations, for example between a well-head and an offshore platform, wherein a flexible hose is arranged to extend between said stations and is secured relative to said stations by means of end fittings associated with respective ends of the hose, the hose comprising a reinforcement structure which extends along the length of the hose and a liner layer of polyethylene which extends along at least a substantial part of the length of the hose and at least a part of the thickness of which lies radially inwards of the reinforcement structure.

The invention further provides a reinforced hose suitable for the transportation of methanol or glycol and comprising a reinforcement structure which extends along the length of the hose and a liner layer of polyethylene which extends along at least a substantial part of the length of the hose and at least a part of the thickness of which lies radially inwards of the reinforcement structure.

The hose reinforcement structure may be embedded in the polyethylene layer, may lie adjacent the radially outer surface of that layer or may lie spaced radially outwards therefrom.

Preferably the polyethylene of the liner layer is a cross-linked polyethylene.

The polyethylene or cross-linked polyethylene may be surrounded by a sheath of other material and which sheath preferably is more permeable to glycol and methanol. Examples of suitable materials are polyamides such as nylon 11, polyurethane and for example Hytrel. Preferably the reinforcement structure is provided at the interface between the polyethylene liner layer and the sheath.

It is further preferred that the polyethylene liner layer has a thickness which lies in the range 0.8 to 4.0 mm and more in preferably the range 1.0 to 2.0 mm.

The hose may be a long length reinforced hose in which the polyethylene liner extends continuously for a distance of at least 3 kilometers. The polyethylene liner preferably is a layer formed by continuous extrusion and around which the reinforcement structure is directly applied so as to be received by the nascent polyethylene surface.

The hose reinforcement structure may be comprised by a spiralled or braided type reinforcement for example of aramid reinforcing filaments.

It is further preferred that the layer of polyethylene has a permeation rate of less than one fifth and more preferably less than one tenth that of the surrounding sheath when at atmospheric temperature and pressure.

The invention further provides a multi-conductor umbilical wherein at least one conductor is a conduit which has the construction of a hose of a kind in accordance with the present invention. Preferably that conduit extends helically between ends of the umbilical.

In the umbilical of the present invention it is preferred that a plurality of conductors are surrounded and maintained in a bundled configuration by a first umbilical reinforcement layer comprising reinforcing elements wound at an angle of at least 40°, and more preferably at least 70° relative to the length of the hose. Suitable materials for the reinforcement layer include textiles and metal wires.

The first umbilical reinforcement layer typically may be surrounded by a balanced pair of steel wire reinforcement layers, typically galvanised steel wires, the wires in each layer being arranged to lie at an angle between 15° and 35° relative the length of the umbilical with the elements in one layer lying all at the same pitch and twist direction and opposite that of the wires in the other layer. The pair of wire reinforcement layers provide the umbilical with its main structural strength. They may be surrounded by an outer textile or other layer which provides general protection and facilitates handling of the umbilical.

It is particularly provided that the umbilical of the invention shall not include around the bundle of conductors any layers of a permeability to methanol or glycol less than that of the polyethylene layer of the conduit(s) provided for the transportation of methanol or glycol.

All of the conductors of an umbilical may be in the form of conduits or one or some may be comprised by e.g. an electrical cable or optical fiber cable.

BRIEF DESCRIPTION OF THE DRAWING

Embodiments of the present invention will now be described, by way of example only, with reference to the accompanying diagrammatic drawings in which:

FIG. 1 is a perspective view including an end view of a reinforced hose in accordance with the present invention; and FIG. 2 is a perspective view showing an end portion of an umbilical in accordance with the present invention and with respective layers thereof successively shown cut away.

FIG. 3 is a diagrammatic plan view of an umbilical of the present invention in situ for the transportation of methanol or glycol between two stations.

DETAILED DESCRIPTION OF PREFERRED EMBODIMENTS

A reinforced hose 10 for the transportation of methanol comprises an extruded liner layer 11 of cross-linked polyethylene having a bore of 12.5 mm diameter and a wall thickness of 1.2 mm. The liner layer 11 is surrounded by a reinforcement structure 12 comprising two layers of aramid filaments either braided or spiralled around the hose with the filaments of one layer extending helically in an opposite sense to those of the other layer. The reinforcement structure immediately contacts the outer surface of the liner layer 11. An outer sheath 13 of polyamid is extruded around the reinforcement structure, the sheath having a thickness of 1.5 mm. The sheath is formed by extrusion around the reinforcement structure and is caused to bond to both the polyamid material of the reinforcement structure and the cross-linked polyethylene of the liner.

In this embodiment of the invention the liner layer has a permeability to methanol or glycol which is at least 5 times lower than that of the surrounding sheath material despite being of a smaller wall thickness.

In the embodiment illustrated in FIG. 2 an umbilical 20 comprises an assembly of seven conduits 21 six of which extend helically around a central rectilinear conduit 22. Each of the seven conduits is constructed to correspond to the reinforced hose of FIG. 1.

The seven conduits are maintained in a bundle by a surrounding reinforcement structure 23 which serves also to transmit loads between the ends of the umbilical. The reinforcement structure comprises an inner reinforcing layer 24 of textile wire which extends at an angle of 75° relative to the longitudinal direction of the umbilical. That is surrounded by a balanced pair of steel wire reinforcing layers 25,26 which provide the umbilical with its main ability to withstand radial pressure differentials and to accommodate longitudinal loading. Each of these reinforcing layers comprises steel wire cords laid at an angle of approximately 15° relative to the length of the hose, with the steel wires of one layer extending all at the same angle and direction and the wires of the other layer extending at an equal angle of inclination to the length of the hose but in an opposite direction. The two wire reinforcement layers 25,26 are surrounded by an outermost layer 27 of helically wound textile reinforcement which facilitates handleability by operating personnel. The outermost layer is formed by winding at an angle of 75° relative to the length of the umbilical.

The present invention particularly envisages that an umbilical shall be provided with a bundle of conduits surrounded by a structure of relatively highly permeable form. Thus in the specific embodiment described with reference to FIG. 2 the successive component layers forming the reinforcement structure 23 each comprise reinforcing layers laid e.g., at touch pitch; none of the reinforcement layers or other structure surrounding the bundle of conduits provides a substantially impermeable barrier.

In the method of the invention end fittings of conventional form are attached to respective ends of the umbilical (or an individual reinforced hose) for connection to respective fittings at e.g., a well-head and platform structure.

FIG. 3 shows the umbilical 20 of FIG. 2 extending between two stations 30,31 and secured to said stations by means of end fittings 32,33 associated with respective ends of the hose.

I claim:

1. A multi-conduit umbilical for the transportation of methanol or glycol over a distance of at least 3 kilometers and comprising a plurality of conduits at least one of which is comprised of a flexible hose comprising a hose reinforcement structure which extends along the length of the hose and a liner layer of cross-linked polyethylene which extends along at least a substantial part of the length of the hose at least at a position radially inwards of the hose reinforcement structure, the plurality of conduits forming the umbilical being maintained in a bundled configuration by a surrounding umbilical reinforcement structure.

2. A multi-conduit umbilical according to claim 1 wherein the hose reinforcement structure is embedded in the hose liner layer.

3. A multi-conduit umbilical according to claim 1 wherein the hose liner layer and hose reinforcement structure are surrounded by a sheath.

4. A multi-conduit unbiblical according to claim 3 wherein said sheath is of a material other than polyethylene and is more permeable to glycol and methanol than said liner.

5. A multi-conduit umbilical according to claim 3 wherein said sheath has a permeation rate which is at least 5 times that of the hose liner layer to methanol liquid.

6. A multi-conduit umbilical according to claim 5 wherein said sheath has a permeability rate at least 10 times that of the hose liner.

7. A multi-conduit umbilical according claim 1 wherein said hose liner layer has a thickness which lies in the range 0.8 to 4.0 mm.

8. A multi-conduit umbilical according to claim 7 wherein the thickness of the hose liner layer lies in the range 1 mm to 2.0 mm.

9. A multi-conduit umbilical according to claim 1 wherein the assembly of conduits is surrounded by an umbilical reinforcement structure having a permeability to methanol or glycol less than that of the polyethylene liner of said hose conduit.

10. A multi-conduit umbilical according to claim 1 wherein the permeability of the umbilical reinforcement structure is at least 5 times that of said hose liner layer.

11. A method for the transportation of methanol or glycol between two stations wherein an umbilical according to claim 1 is arranged to extend between said stations and is secured relative to said stations by means of end fittings associated with respective ends of the umbilical.

* * * * *